June 4, 1968    R. E. NULL    3,386,684
ROD MATERIAL HANDLING AND UNCOILING SYSTEM
Filed July 14, 1966    2 Sheets-Sheet 1
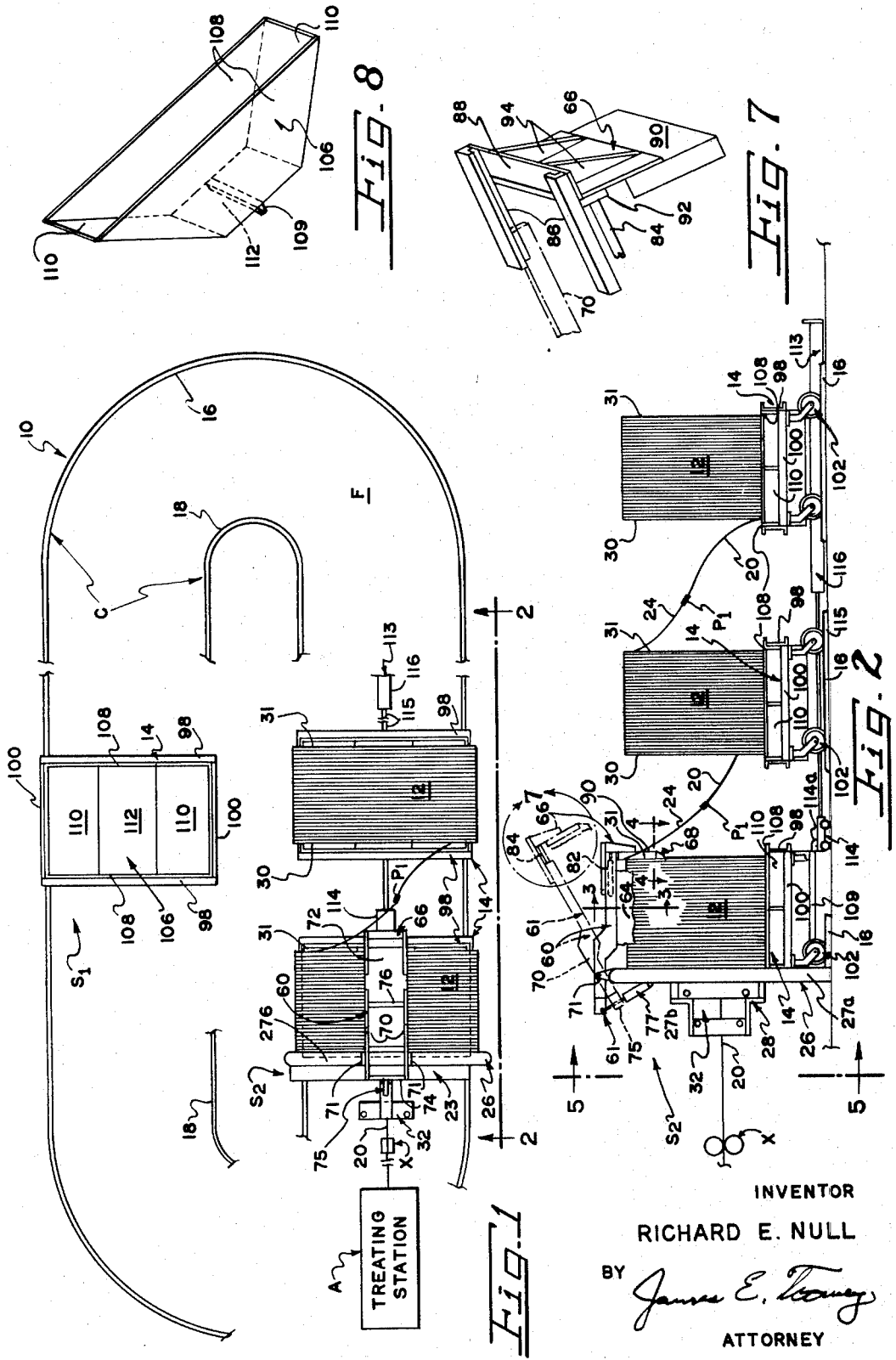
INVENTOR
RICHARD E. NULL
BY
ATTORNEY

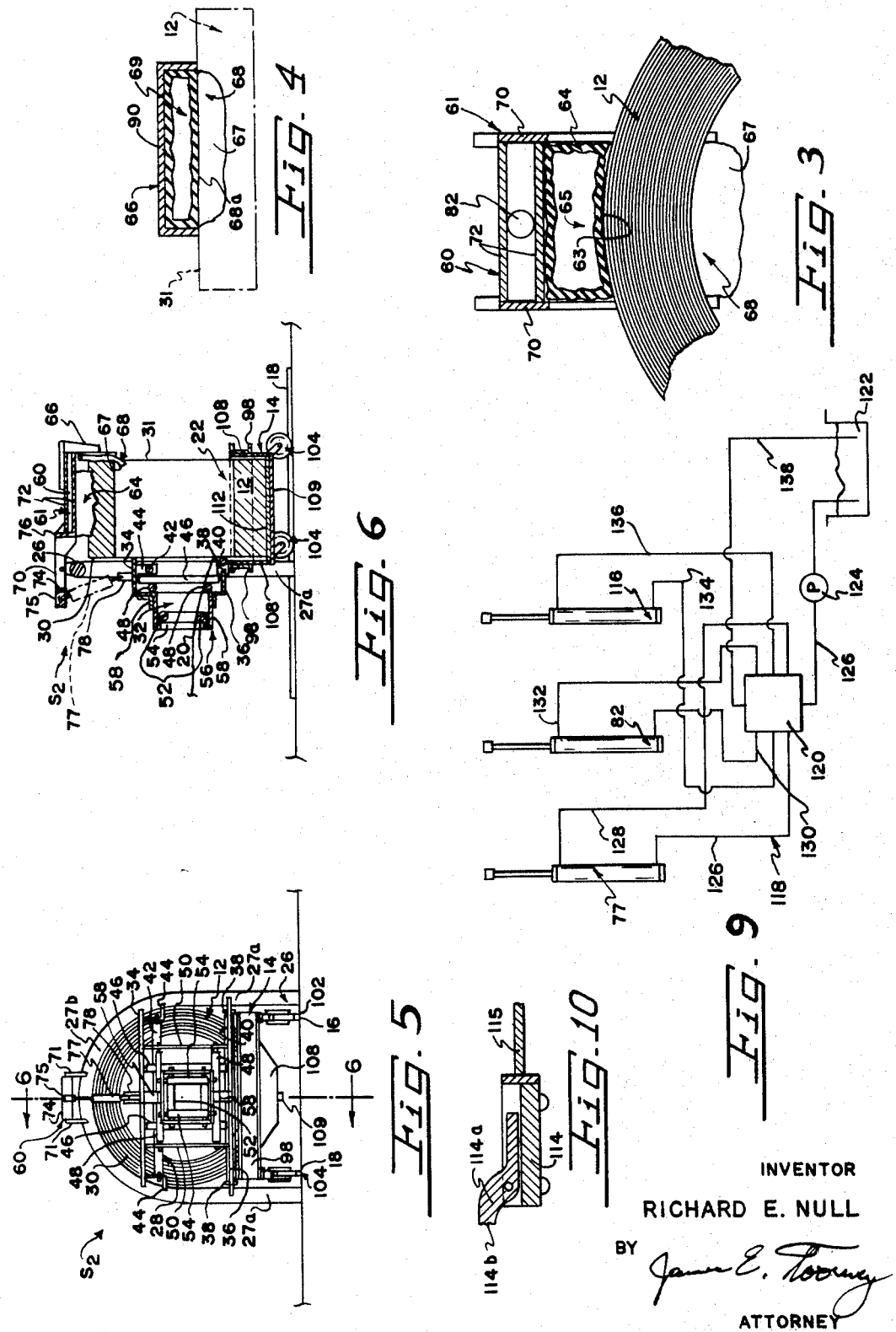

United States Patent Office 3,386,684
Patented June 4, 1968

3,386,684
ROD MATERIAL HANDLING AND
UNCOILING SYSTEM
Richard E. Null, Spanish Fort, Ala., assignor to Kaiser
Aluminum & Chemical Corporation, Oakland, Calif., a
corporation of Delaware
Filed July 14, 1966, Ser. No. 565,170
15 Claims. (Cl. 242—128)

This invention relates to a system provided with appropriate stations and apparatus for handling coils of rod or rod-like material and for supplying the rod or rod-like material to a material treating station. More particularly it relates to an improved system provided with appropriate stations and improved apparatus for handling helically wound coils of rod and rod-like materials wherein successive coils can be progressively unwound while being fed in a substantially continuous fashion to a material treating station.

Accordingly, it is the primary purpose of the instant invention to provide an improved system provided with appropriate stations and improved apparatus for handling helically wound coils of rod or rod-like materials wherein successive coils can be progressively unwound while being fed in a substantially continuous fashion to a material treating station.

This and other purposes and advantages of the instant invention will become more apparent from a review of the following detailed description when taken in conjunction with the appended drawings, wherein:

FIG. 1 is a diagrammatic plan view in which certain parts have been broken away of a preferred form of apparatus embodying the instant invention and illustrates the general location of correlated coil loading and unloading stations and a conveyor transfer means associated therewith;

FIG. 2 is a side elevational view taken generally along line 2—2 of FIG. 1 with parts removed and with other parts added and illustrates in greater detail a barrier or harness arrangement used at the unloading station for effecting uncoiling of a coil body in order to supply a continuous length of coiled material to a material treating station;

FIG. 3 is an enlarged sectional view taken generally along line 3—3 of FIG. 2 wherein certain parts have been broken away and illustrates certain details of the equipment at the unloading station for effecting engagement of certain outer surface portions of a helically wound coil body during the unwinding thereof;

FIG. 4 is an enlarged sectional view taken generally along line 4—4 of FIG. 2 wherein certain parts have been removed and other parts are shown in dotted lines and illustrates further details of the equipment at the unloading station for effecting engagement of a portion of the end face of a coil body during the uncoiling thereof;

FIG. 5 is a front end view of part of the apparatus of FIG. 2 when generally taken along line 5—5 of FIG. 2 and illustrates the relative disposition of a barrier device and a coil body being unwound at the unloading station;

FIG. 6 is a cross-sectional view taken along line 6—6 of FIG. 5;

FIG. 7 is an enlarged perspective view taken within the bounds of encompassing line 7 in FIG. 2 with parts removed, with certain parts being shown in dotted lines and with other parts fragmented and illustrates details of a portion of the latching means used at the unloading station of the instant invention;

FIG. 8 is an enlarged perspective view of a certain structural portion of the wheeled cart used in the conveyor portion of the system of the instant invention;

FIG. 9 is a schematic view of a suitable hydraulic control circuit for effecting operation of the apparatus of the instant invention at the unloading station; and FIG. 10 is an enlarged view in longitudinal cross-section of the end of a carriage device shown in FIGS. 1 and 2 for advancing a coil carrying cart of the conveyor means into position against the barrier device at the unloading station.

With further reference to the drawings and in particular FIGS. 1 and 2, a preferred system and improved form of apparatus that can be used for carrying out the teachings of the instant invention in the supplying of a continuous length of metallic rod or rod-like material to a material treating station A such as an annealing oven or rod drawing device generally comprise an overall apparatus 10. Apparatus 10 includes loading and unloading stations $S_1$ and $S_2$ mounted on a floor F or like support surface. These stations are also disposed along an endless conveyor trackway C and a unique barrier 26 is disposed at the unloading station for individually arresting any successive number of coil bodies 12 transported along the conveyor trackway C which interconnects the stations $S_1$ and $S_2$. Mounted on trackway C is a series of wheeled carts 14 for carrying the individual coil bodies 12 of metallic rod in a stationary, upright, and non-collapsible position. These carts traverse the spaced track elements 16 and 18 defining the conveyor trackway C between the stations $S_1$ and $S_2$.

The barrier 26 at the unloading station $S_2$, as will be further apparent hereinafter, is provided with novel latching means for releasably engaging portions of a coil body 12 so as to positively retain and support the coil body against the barrier 26 during the unwinding thereof as well as improved means for directing the uncoiled rod to the material treating station A. After complete unwinding of a coil body 12 and its removal from a cart 14, the empty cart 14 is advantageously able to freely pass under and through the barrier 26 at the unloading station $S_2$. From station $S_2$ the cart is then moved along the track elements 16 and 18 to the loading station $S_1$ where the empty cart 14 as shown in FIG. 1 can be reloaded with another coil body in a known fashion such as by a hoist (not shown).

It is to be understood that the various coil bodies 12 are preferably of toroidal configuration. They can be made up of lengths of aluminum or aluminum alloy rod material compactly coiled in a known manner into a desired number of successive superposed helical windings. Further, the coil bodies can even be made up of lengths of spirally wound windings. The word "helical" as used in the claims is, therefore, intended not only to mean helically wound coil bodies but also spirally wound coil bodies. The rod coils can also be of unusually large size if desired. Although the coil body is of relatively heavy weight, it should be wound in such a fashion so as not to have the tendency to collapse especially when disposed in a stationary upright position in a cart 14. The overall width of the coil body should be such as to permit free deposition of a lower segment thereof in the pan 106 of a cart 14 at the loading station $S_1$. It is to be further understood that the relative overall diameter of the coil body, even though carried in the cart 14 in accordance with the teachings of the instant invention, will always be such as not to interfere with its being readily unloaded at station $S_2$. As best shown in FIG. 6 the superposed helical windings of a coil body 12 will be arranged relative to each other in such a fashion that the body will have a central opening 22 therethrough defining a central eye and radial end faces 30 and 31. During unwinding of the coil body 12 at station $S_2$ it is preferred that the end 20 of the innermost helical winding be the leading or starting end for unwinding the coil body 12. The trailing end of the coil body, or the end 24 of the outermost layer of windings, can be advantageously connected at point $P_1$, such as by welding, to the leading inner end 20 of the successive coil body 12 as viewed at the right in FIGS. 1 and 2. Thus any number of coil bodies 12 can be interconnected in this fashion in order to supply the material treating station A in a continuous fashion with the unwound rod being fed uninterruptedly from successively unwound coils in accordance with the teachings of the instant invention.

The carts 14 disposed on conveyor trackway C are made up of end and side members 98 and 100 interconnected in such a fashion so as to define a frame of generally rectangular configuration. The channel-shaped members 100 can be of relatively shorter length than the other channel-shaped members 98 and they are interconnected with the channel-shaped members 98 such that the web portions thereof are generally coextensive with the lower flange portions of the members 98 so as to enable pivotal mounting of a pair of wheels 102 and 104 affixed to opposite bottom portions of a cart. In other words, a pair of caster type wheels 102 can be affixed to the ends of a member 100 on one side of the cart while the other pair of caster type wheels 104 is pivotally affixed in a corresponding manner to the other member 100 on the opposite side thereof in the fashion indicated in FIGS. 2 and 5.

The outer and inner track elemnts 16 and 18 of the conveyor trackway are endless and can be of conventional I-shape in cross-section for receiving the grooved wheels 102 and 104. Although the track elements 16 and 18 define an elliptical path of travel for the carts, it is to be understood that the path could be of any suitable configuration, depending on the locations of stations $S_1$ and $S_2$.

In addition to frame members 98 and 100 and wheels 102 and 104, each cart 14 as indicated above includes a pan element 106 for receiving and holding a coil body 12 in a stationary, upright and non-collapsible position during passage of the cart between the stations $S_1$ and $S_2$. The pan element 106 as best shown in FIG. 8 is disposed inside of and connected, such as by welding, to the channel shaped members 98 and 100 of each cart. Pan 106 is made up of a pair of spaced side plates 108 of trapezoidal configuration, a pair of corresponding end plates 110 and a bottom plate 112. The side plates are held in spaced relation by the end plates 110 extending between and connected to the associated sloped edges of the side plates 108 at the opposite ends thereof. The bottom plate 112 extends between and is connected to the opposed inner edges of the end plates 110 and the lower edgs of the side plates 108. The bottom plate 112 has a transverse bar member 109 affixed thereto, the purpose of which is to be subsequently described. Each pan 106 should be deep enough to loosely receive and maintain a helically wound coil body in a stationary and upright position without tipping during travel of the cart 14 between stations and also while at rest at either station $S_1$ or $S_2$. Thus, the side plates 108 of a pan are preferably spaced apart a distance slightly in excess of the overall width of a coil body.

The barrier or harness 26 at the unloading station $S_2$ preferably comprises a one-piece framework or stanchion of U-shaped configuration such that it has spaced leg portions 27a at the free ends thereof which can be anchored in a suitable manner to the floor F as illustrated in FIGS. 2, 5 and 6 and a web portion 27b. A bridgework 28 extends laterally between the spaced leg portions 27a for the purpose of preventing movement of a cart 14 through the carrier 26 when loaded by engaging the end face 30 of a coil body 12 disposed in a cart 14. However, when the coil body 12 becomes completely unwound the lower end of the bridgework 28 is sufficiently spaced above the top of an empty cart 14, whereby the empty cart is able to clear the bridgework 28 and freely pass through the barrier 26 and along trackway C to the loading station $S_1$ for reloading while at the same time not interfering with the uncoiling of rod in the next succeeding cart. Mounted on the one side of bridgework 28 is a guide roller means generally indicated at 32 for use in uncoiling successive portions of coiled rod starting with the leading end 20 of the rod making up a coil body 12 at the innermost helical winding thereof and in directing the uncoiled portions of the body to the material treating Station A.

Bridgework 28 is preferably comprised of a pair of upper and lower relatively flat strips 34 and 36 disposed in spaced parallel relation to each other and affixed at their ends such as by welding to the legs 27a of the barrier 26. The lower strip 36 is preferably of longer length than the upper strip 34 as is evident from an examination of FIG. 5 and the outer edges of the strips 34 and 36 or the edges closest to the station A, are generally disposed in vertical alignment. The inner edge of the lower strip 36 includes a pair of laterally extending ears 38 adjacent its affixed ends. A guide roller 40 advantageously extends between and is rotatably mounted upon the associated ears 38 in a known manner. As further indicated in FIG. 6, the innermost peripheral portion of the surface of the roll 40 is disposed tangential to and in vertical alignment with the inner edge of the upper strip 34. By virtue of such disposition, roll 40 not only assists in the initial unwinding of the coil body starting with the inner end 20 thereof by serving as a ledge for the rod, but it also acts as a bumper along with the inner edge of the upper strip 34 for engaging the end face 30 of a coil body 12 in order to maintain the coil body 12 in a stationary, upright position in the cart 14 and against the barrier 26 during the unwinding thereof.

It is to be observed here that the overall diametrical extent of the coil body 12 when carried in its respective cart 14 is slightly less than the inside lateral dimensions of the harness opening as defined by the inside surfaces of the legs 27a and the inside radial dimension of the harness opening as defined by the arcuate web portion 27b. The particular dimensions of the spaced legs 27a and the arcuate web portion 27b provide assurance that the upper strip 34 and roll 40 will engage the end face 30 of the coil body 12 during any part of its unwinding at station $S_2$ rather than harness 26 itself as is evident upon a study of FIGS. 5 and 6.

Another freely mounted roll 42 of similar length to roll 40 is disposed above and in a slightly offset fashion relative to roll 40. The ends of roll 42 are journalled in a pair of L-shaped brackets 44 that are welded to the legs 27a of the framework 26 and the ends of the upper strip 34 in the manner shown in FIG. 5. The roll 42, although disposed inwardly of the inner edge of the upper strip 34, advantageously cooperates with the lower roll 40 in initially uncoiling and directing successive portions of uncoiled rod through the guide means 32 affixed to brigdework 28.

Separate pairs of vertically and horizontally arranged rolls 46, 48, of relatively shorter length than the rolls 40 and 42 are disposed outwardly of rolls 40 and 42. These rolls are held in place by means of strip elements 34 and 36 in the case of rolls 46 and by means of members 50 in the case of rolls 48. These vertically disposed members 50, while reinforcing the spaced strips 34 and 36 to which they are secured, rotatably mount the horizontal rolls 48 at their ends in parallel spaced relation to each other in the manner shown. Similarly, the pair of vertical rolls 46 disposed inwardly of the spaced vertical members 50, are rotatably mounted at their ends to the strips 34 and 36 between the rolls 48 and the rolls 40 and 42 as best shown in FIGS. 5 and 6.

Additional separate pairs of vertical and horizontal rolls 52 and 54 are rotatably mounted forward of the aforedescribed rolls in a box-like sub-frame made up of four plate elements interconnected at their ends and generally indicated at 56. The separate pairs of rolls 52 and 54 are of relatively shorter length than the other sets of rolls 40, 42, 46 and 48. The sub-frame of interconnected plate elements 56 is interconnected to the upper and lower strips 34 and 36 by the means of a pair of L-shaped brackets 58. The smaller leg section of each bracket 58 is affixed at its free end to an intermediate portion of the associated upper or lower strip 34 or 36 as the case may be. The longer leg section of each bracket 58 is, however, affixed at its free end to an intermediate portion of the associated upper plate or lower plate of the sub-frame 56. From the above it is now evident that the aforedescribed series of rolls 40, 42, 46, 48, 52 and 54, which are in general alignment with the central opening or eye of a coil body 12 provide an improved guide means 32 or tunnel of rolls of progressively reduced cross section, which advantageously directs and supplies successive portions of uncoiled rod 20 without kinking or entanglement thereof to the material treating station A.

In order to retain the coil body 12 with its end face 30 in proper engagement with the bridgework 28 and the guide means 32, the coil body 12 is additionally supported in a stationary, upright but non-collapsible position by a latching element 60 pivotally connected to the barrier 26. This latching element 60 is adapted to loosely and releasably engage an upper portion of the outer periphery of the coil body 12. The latching element 60 includes a pivotal gate or arm 61 and an extendable finger 66 connected to the forward end of the arm. The arm 61 can be made up of a pair of elongated side plates 70, which have a shallow Z-shaped configuration, and another pair of plates 72 extending between and secured to the upper and lower edges of the side plates 70 at the forward end thereof for holding the side plates 70 in parallel spaced relation. A reinforcing plate 76 disposed intermediate the ends of the side plates 70 extends transversely thereof and abuts the inner ends of the upper and lower plates 72. The pivotal end of the arm 61 is provided with a plate 74 of T-shape extending between the ends of the spaced side plates 70. The stem portion 75 of the plate 74 can be connected to the roll end of a fluid actuator 77. The other end of the actuator 77 is pivotally connected to a pair of spaced lugs 78 are connected to and project upwardly from an intermediate portion of the upper strip 34 on the cross-piece attachment or bridgework 28. The side plates 70 are pivotally connected intermediate their ends to the arcuate web portion 27b of the barrier 26 by a pair of spaced ears 71 affixed thereto. The upper end of the ears 71 includes transverse openings therethrough for alignment with openings in the side plates 70, whereby the arm 61 can be pivotally connected to the barrier 26 in a known manner and in order that the arm 60 can be pivoted by the fluid actuator 77 between a raised and lowered position (see dotted and solid lines in FIG. 2).

In order for the arm 61 to releasably engage an upper peripheral portion of the outer layer of the compact and helically wound coil body 12 at the station $S_2$ a resilient pad means 64 is affixed to the underneath portion of the arm at the forward end thereof in the manner illustrated in FIGS. 2–3 and 6. The pad means 64 is preferably made up in a conventional fashion of a web of impervious material of appropriate stretchability and flexibility. Interconnected panels of the web material are constructed and arranged to define a closed hollow body of approximately rectangular shape in overall appearance and having a hollow interior 65. The impervious material can be a tightly woven canvas of a natural or synthetic fiber of appropriate thickness. It can be treated whereby it is rendered impervious to the passage of fluids under pressure by being impregnated with rubber or rubber-like material or even a suitable synthetic material. The interior portion or enclosure 65 of the pad means 64 as best shown in FIG. 3 can be filled with a compressible fluid under pressure such as air by an appropriate valve means (not shown). The upper face of the pad-like means, opposite the bottom face 63 thereof which is in direct engagement with the peripheral portion of the outer layer of helical windings of the coil body, can be securely attached such as by a suitable adhesive to the lower plate 72 of the arm of the latching means 60. Consequently, the pad means 64, when inflated to a desired pressure and positioned with its lower or contacting face 63 in engagement with the peripheral portion of the coil body 12 in the fashion illustrated in FIG. 3, can collapse sufficiently for the contacting face 63 thereof to substantially conform to the contour of the peripheral portion of the coil body 12 with which it is in binding engagement. It is to be further understood that the web material of the pad means 64 has the further characteristic that its contacting face 63 does not deleteriously effect, such as by scraping or scratching, the surface finish of the rod of the coil body 12 during the unwinding thereof at station $S_2$.

The extensible finger element 66 of the latching element 60 is connected to the forward end of the arm 61 by a fluid actuator 82 the cylinder portion of which can be mounted and anchored in a conventional manner between the side plates 70 and spaced web plates 72 in FIG. 2. The rod 84 of the actuator 82 is connected at its forward end to a rigid assembly of bars 86 and plates 88, 92 and 94 for the purpose of maintaining the finger element 66 in alignment with the arm of the latching means 60 and in engagement with a portion of the end face of the coil body 12 at station $S_2$. The spaced bars 86 can be L-shaped, whereby they can fit over and slide on the upper edges of the associated side plate 70 of the arm 61 as indicated in FIG. 7. The bars 86 are connected at one of their ends to the ends of the smaller leg of an L-shaped bracket 88. The larger leg of the L-shaped bracket 88 is adjustably affixed in a known fashion to the web portion of a channel-shaped member 90. The forward end of the rod 84 includes a plate 92 affixed thereto. Plate 92 is also connected to the L-shaped bracket 88 adjacent the inner end of its longer leg. A pair of triangularly shaped gusset plates 94 extending between opposite faces of the legs of the L-shaped bracket 88 act as reinforcing means. The slidable nesting engagement of the notched lower surface of each one of the bars 86 with the associated upper edge of the respective side plate 70 of the arm 61 of the latching element 60 advantageously maintains the finger element 66 in alignment with the arm 61 of the latching element 60 throughout the use thereof.

In order for the finger element 66 to properly engage a portion of the radial end face 31 of the coil body 12 at station $S_2$, the channel-shaped member 90 is provided with a resilient pad means 68 of similar construction as the aforedescribed pad means 64. The pad means 68 preferably approximates the shape of the letter J such that the longer leg thereof is mounted within the channel-shaped recess of the member 90 as best shown in FIGS. 4 and 6. The hollow interior 69 of pad-means 68 can be connected to a compressible fluid under pressure in a similar fashion as pad means 64 such that the outer face 68a of the pad means 68 will be disposed in proper engagement with a portion of the end face 31 of the coil body at station $S_2$. Normally the pad means 68 is inflated to a predetermined pressure in order that the pad means 68 upon engagement with an upper radial portion of the end face 31 of the coil body 12 will partially collapse into the channel-shaped recess of the member 90 in the manner shown in FIG. 4.

As the coil body shrinks upon uncoiling the continued introduction of pressure fluid into the pad means 68 will allow the pad means to at least partially expand so as to maintain engagement with the coil body and compensate somewhat for the shrinkage of the coil body. The same function to some extent is also performed by pad means 64. The small leg portion 67 of pad means 68, which extends beyond the lower end of the channel-shaped member 90 is usually not in engagement with a portion of the end face of the coil body 12 and merely functions to prevent undesired separation and collapse of the inner layers of the helical windings of the coil body 12 during the unwinding thereof at station $S_2$. From the above it is evident that, when the latching element 60 is in its lowermost position and with its finger element 66 retracted, the resilient pad means 64 and 68 will not only loosely and firmly hold a coil body 12 at station $S_2$ against upper strip 34 and the roll 40 of the bridgework 28 but will also hold the superposed helical windings of the coil body in a tight compact condition so as to prevent undesirable kinking and entanglement of the various windings with each other during the unwinding of the coil body 12.

Although not heretofore mentioned, it is to be understood that suitable apparatus such as the driving pulley rolls X located adjacent and associated with harness 26 actually provide the driving force for withdrawing successive portions of the inner end 20 of the coil body 12 through the guide means 32 at the unloading station $S_2$, and for directing the inner end 20 after exiting from the guide means 32 to the treating station A, once the inner end 20 of the rod is connected by the operator to the equipment at the treating station.

In order to advance a coil filled cart 14 against the barrier 26 at station $S_2$ a suitable indexing device 113 can be provided. In an advantageous embodiment of the invention this device 113 can be comprised of a fluid actuator 116 anchored to the floor and to the right of the barrier 26 as viewed in FIGS. 1–2 and a wheeled carriage or dolly 114 affixed to the forward end of the rod 115 of the actuator 116. The wheels of the dolly 114 are in rolling engagement with the floor as shown in FIG. 2. The forward end of the dolly 114 carries an upstanding lug 114a which is pivotally mounted to the carriage 114 in the manner illustrated in FIG. 10. In the lug 114a in longitudinal cross-section approximates the shape of a shallow letter V and its mass is so distributed that the lug 114a naturally pivots to an upright position in the dolly 114. When the dolly 114 is extended by the actuator 116, the forward end 114b of the lug abuttingly engages the end of the aforedescribed bar 109 on the bottom of the cart 14. Such engagement coupled with extension of the actuator 116 advances the first cart 14 into position against the barrier 26 in FIGS. 1–2. When the actuator 114 is retracted, the lug 114a frees itself from the bar 109 of the first cart and moves underneath the second or succeeding cart 14 positioned at station $S_2$. During the retraction of the actuator 116 and preparatory to the advancement of the next cart 14 to station $S_2$, the lug 114a in its passage underneath the bottom 106 of the next cart 14 is pivoted out of abutting engagement with the bar 109 of the next cart 14 as the lug 114a slides beneath and lightly scrapes the bottom of the last mentioned bar 109.

After emptying the first cart 14 at station $S_2$, the indexing device 113 can function not only for advancing the second cart 14 filled with a coil body 12 into position against the barrier 26 but can also function for advancing at the same time the empty first cart out of its position against the barrier 26. Thus, the empty cart at station $S_2$ does not interfere with the operation of the indexing device 113 in advancing the next cart 14 into position against the barrier 26.

The fluid control circuit 118 shown in FIG. 7 is merely illustrative of one method for operating the apparatus at station $S_2$ of the instant system. The circuit 118 includes a manually operated control valve 120 that can be continuously supplied with fluid under pressure from a fluid reservoir 122 by a fluid pump 124 connected intermediate the ends of the supply line 126. The aforedescribed fluid actuators 77, 82 and 116 are connected by their respective pairs of branch conduits 126 and 128, 130 and 132, 134 and 136 to the control valve 120. Upon the selective operation of the control valve 120 by the operator, fluid under pressure can be directed to either the rod end or the piston end of the associated fluid actuators 77, 82 or 116 as the case may be. If desired, valve 120 can be used to control actuator 82 for the finger element 66 in such a fashion whereby as the coil body shrinks upon uncoiling the finger element will gradually retract. Excess pressure fluid flowing into control valve 120 during its operation is passed through the customary exhaust line 138 to the fluid reservoir 122.

An advantageous embodiment of the invention has been shown and described.

It will be obvious to those skilled in the art that various changes and modifications may be made therein without departing from the spirit and scope thereof as set forth in the appended claims, wherein,

What is claimed is:

1. A system for handling and unwinding a coil body made up of a series of successive superposed helical windings of rod or rod-like material, said system including a fixed harness means at a given coil body handling station for engaging a first end face of the coil body and for loosely supporting said coil body in a stationary upright position, resilient latch means connected to said harness means for releasably engaging a portion of the outer periphery of the coil body and for retaining said coil body in a stationary upright non-collapsible position against said harness means upon the disposition of the coil body at the harness means, means for transporting a coil body to said harness means, and means associated with said harness means for uncoiling and directing successive portions of the coil body to a further material treating station by withdrawing successive helical windings of the coil body from the body starting with the innermost helical winding thereof.

2. A system as set forth in claim 1 in which said latch means includes an arm pivotally connected to said harness means and an extensible coil body engaging finger element disposed at the outer end of said arm.

3. A system as set forth in claim 1 wherein said harness means is provided with guide roller means for directing successive portions of uncoiled helical windings from said coil body through said harness means in a tangle free condition.

4. A system as set forth in claim 1 wherein said means for transporting said coil body to said harness means includes a track mounted cart which supports the coil body in a stationary upright position.

5. A system as set forth in claim 2 including a pad means on said arm for resiliently engaging a peripheral portion of the outermost helical winding of the coil body.

6. A system as set forth in claim 2 including a pad means on said finger element for resiliently engaging a portion of a second end face of said coil body.

7. A system as set forth in claim 4 including an actuator device associated with said harness means for advancing said cart together with the coil body into position against said harness means.

8. An apparatus for use in unwinding a coil body made up of a series of successive superposed helical windings of rod or rod-like material, said apparatus including a fixed upright harness means for engaging only one of the end faces of the coil body and for loosely supporting said coil body in a stationary upright position, resilient gate means connected to the harness means for releasably engaging outer surface portions of said coil body and for retaining said coil body in a stationary upright position against said harness means, and means associated with said harness means and aligned with the central opening of the coil body for directing successive portions of the coil body to a material treating station upon the withdrawal of successive helical windings of the coil body from the coil body starting with the innermost helical winding thereof.

9. An apparatus as set forth in claim 8 wherein said gate means comprises an arm pivotally connected to said harness means.

10. An apparatus as set forth in claim 8 wherein said gate means comprises an arm pivotally connected to said harness means and a finger element reciprocally connected to the outer end of said arm.

11. An apparatus as set forth in claim 8 wherein said gate means includes compressible pad means for engaging selected outer surface portions of the coil body so as to retain the coil body in an upright position upon the shrinkage of the coil body due to unwinding.

12. An apparatus as set forth in claim 8 wherein the means for directing successive portions of the unwound coil body to a material treating station comprise a tunnel of rolls.

13. An apparatus as set forth in claim 10 wherein said arm and finger element are each provided with a compressible pad means for engaging selected outer surface portions of the coil body.

14. A system for handling and uncoiling a coil body made up of a series of superposed helical windings of a metallic rod material comprising the combination of a plurality of stations, a trackway interconnecting the stations with each other, a cart means traversing said trackway, said cart means being adapted to receive the coil body to and supports the coil body at a second station, upright position as the cart means advances the coil body to and supports the coil body at a second station, a harness means at the second station which acts in conjunction with the cart means to retain the coil body in a stationary upright noncollapsible position while releasably and loosely engaging selected outer surface portions of the coil body and means associated with said harness means for uncoiling and directing successive portions of the coil body to a further material treating station in a tangle-free condition by withdrawing successive helical windings of the coil body from the coil body starting with the innermost helical winding of the coil body and without interference from said harness means.

15. A system as set forth in claim 14 including actuator means for engaging and advancing successive coil body filled carts to a preselected position adjacent the harness means.

References Cited
UNITED STATES PATENTS

| | | | |
|---|---|---|---|
| 2,202,204 | 5/1940 | Hogue | 242—128 |
| 2,713,464 | 7/1955 | King | 242—128 |
| 2,819,854 | 1/1958 | Romig | 242—129 |

LEONARD D. CHRISTIAN, *Primary Examiner.*

UNITED STATES PATENT OFFICE
CERTIFICATE OF CORRECTION

Patent No. 3,386,684  
June 4, 1968

Richard E. Null

It is certified that error appears in the above identified patent and that said Letters Patent are hereby corrected as shown below:

Column 3, line 26, "elemnts" should read -- elements --; line 67, "carrier" should read -- barrier --. Column 4, line 53, "brigde" should read -- bridge --. Column 5, line 38, "roll" should read -- rod --; line 39, "78 are" should read -- 78. The lugs 78 are --. Column 6, line 25, "face" should read -- face 31 --. Column 7, line 33, "In the lug" should read -- The lug --. Column 9, line 22, "body to and supports the coil body at a second station," should read -- body at one station and to support the coil body in an --.

Signed and sealed this 7th day of April 1970.

(SEAL)  
Attest:

Edward M. Fletcher, Jr.  
Attesting Officer

WILLIAM E. SCHUYLER, JR.  
Commissioner of Patents